(12) United States Patent
Yu et al.

(10) Patent No.: US 11,099,454 B2
(45) Date of Patent: Aug. 24, 2021

(54) OPTICAL MODULATOR

(71) Applicants: ROCKLEY PHOTONICS LIMITED, London (GB); UNIVERSITY OF SOUTHAMPTON, Southampton (GB)

(72) Inventors: Guomin Yu, Glendora, CA (US); Aaron John Zilkie, Pasadena, CA (US); Yi Zhang, Pasadena, CA (US); David John Thomson, Southampton (GB)

(73) Assignees: Rockley Photonics Limited, Altrincham (GB); University of Southampton, Southampton (GB)

( * ) Notice: Subject to any disclaimer, the term of this patent is extended or adjusted under 35 U.S.C. 154(b) by 57 days.

(21) Appl. No.: 16/496,934

(22) PCT Filed: Mar. 22, 2018

(86) PCT No.: PCT/EP2018/057287
§ 371 (c)(1),
(2) Date: Sep. 23, 2019

(87) PCT Pub. No.: WO2018/172454
PCT Pub. Date: Sep. 27, 2018

(65) Prior Publication Data
US 2020/0089076 A1    Mar. 19, 2020

(30) Foreign Application Priority Data

Mar. 24, 2017   (GB) .................................. 1704739

(51) Int. Cl.
*G02F 1/225*   (2006.01)
*G02F 1/01*    (2006.01)
*G02F 1/21*    (2006.01)

(52) U.S. Cl.
CPC .......... *G02F 1/2257* (2013.01); *G02F 1/0121* (2013.01); *G02F 1/212* (2021.01); *G02F 2202/06* (2013.01)

(58) Field of Classification Search
None
See application file for complete search history.

(56) References Cited

U.S. PATENT DOCUMENTS

2002/0186453 A1   12/2002   Yoo
2006/0008223 A1    1/2006   Gunn, III et al.
(Continued)

FOREIGN PATENT DOCUMENTS

GB    2 348 293 A    9/2000

OTHER PUBLICATIONS

GB Search Report under Section 17(5) dated Sep. 19, 2017 issued in Application No. GB1704739.0, 4 pages.
(Continued)

*Primary Examiner* — Chad H Smith
(74) *Attorney, Agent, or Firm* — Lewis Roca Rothgerber Christie LLP

(57) ABSTRACT

A method of operating an optical modulator. The optical modulator having: a rib waveguide which includes a junction which is either a PIN or PN junction, the junction having a breakdown voltage. The method comprising: applying a reverse bias to the junction, so as to operate the optical modulator around the breakdown voltage of the junction; operating the modulator in an avalanche multiplication and/or band-to-band tunnelling mode by increasing the reverse bias past the breakdown voltage.

27 Claims, 4 Drawing Sheets

(56) References Cited

U.S. PATENT DOCUMENTS

| | | | |
|---|---|---|---|
| 2012/0189239 A1* | 7/2012 | Tu | G02F 1/025 |
| | | | 385/2 |
| 2014/0233878 A1* | 8/2014 | Goi | G02F 1/2257 |
| | | | 385/3 |
| 2015/0340532 A1* | 11/2015 | Hekmatshoar-Tabari | ............... |
| | | | H01L 31/03762 |
| | | | 136/244 |
| 2016/0062156 A1* | 3/2016 | Baehr-Jones | G02F 1/025 |
| | | | 385/3 |
| 2017/0176780 A1* | 6/2017 | Levy | G02B 6/29338 |

OTHER PUBLICATIONS

GB Examination Report under Section 18(3) dated Sep. 17, 2018 issued in Application No. GB1704739.0, 4 pages.

GB Examination Report under Section 18(3) dated Dec. 10, 2018 issued in Application No. GB1704739.0, 3 pages.

GB Combined Search and Examination Report under Sections 17 and 18(3) dated Jun. 20, 2019 issued in Application No. GB 1821244.9, 4 pages.

Desiatov, Boris et al. "Defect-Assisted Sub-Bandgap Avalanche Photodetection in Interleaved Carrier-Depletion Silicon Waveguide for Telecom Band," Department of Applied Physics, The Benin School of Engineering and Computer Science, and The Harvey Krueger Center for Nanoscience and Nanotechnology, The Hebrew University of Jerusalem, 91904, Israel, 2 pages.

International Search Report dated Jun. 21, 2018 issued in Application No. PCT/EP2018/057287, 14 pages.

\* cited by examiner

OPTICAL MODULATOR

CROSS-REFERENCE TO RELATED APPLICATION(S)

This application is a national stage entry, under 35 U.S.C. § 371, of International Application Number PCT/EP2018/057287, filed on Mar. 22, 2018, which claims priority to and the benefit British Patent Application Number 1704739.0, filed Mar. 24, 2017. The entire contents of all of the applications identified in this paragraph are incorporated herein by reference.

FIELD OF THE INVENTION

The present invention relates to optical modulators operated in reverse bias.

BACKGROUND

Optical technology, for example optical interconnects, seem apt for replacing electrical interconnects within data networks and intra-/inter-chip datalinks. A key device in such optical interconnects is the optical modulator. An example of such an optical modulator is the Silicon Mach-Zehnder phase modulator, which operates under the principle of either carrier injection or carrier depletion conditions.

In a carrier injection condition, the modulators phase shifters are formed of PIN junctions that are under forward bias. As a result, large numbers of free carriers are injected into the I-region (also referred to as intrinsic region), which results in the change of the refractive index of this region due to the free carrier plasma dispersion effect. Therefore, light passing through such a region encounters a change of phase, which can be utilised to modulate the output of a Mach-Zehnder modulator.

However, such forward biased modulators have a slow modulation speed.

In alternative configurations, the modulator is used in a carrier depletion condition. In such examples, the modulators phase shifters are made of a PN junction which is under a reverse bias. As such, the electrical field in the depletion region has a high aptitude, and therefore charge carriers can be easily removed from the depletion region. As a result, the modulator exhibits a very high modulation speed (at the detriment of the degree of modulation).

There is therefore a need for a Silicon Mach-Zehnder phase modulator having both a high modulation efficiency and short device length together with a high modulation speed.

SUMMARY

Accordingly, in a first aspect, the invention provides a method of operating an optical modulator,
the optical modulator having:
    a rib waveguide which includes a junction which is either a PIN or PN junction, the junction having a breakdown voltage;
the method comprising:
    applying a reverse bias to the junction, so as to operate the optical modulator around the breakdown voltage of the junction;
    operating the modulator in an avalanche multiplication and/or band-to-band tunnelling mode by increasing the reverse bias past the breakdown voltage.

By operating the optical modulator in such a fashion, the modulator may exploit either avalanche multiplication or band-to-band tunnelling to provide a large number of charge carriers into a depletion region of the junction, resulting in high modulation efficiency. Furthermore, as the reverse bias voltage at or past the breakdown point provides a large electrical field, the charge carriers can be quickly swept out of the depletion region, and therefore the modulation speed can be high.

In a second aspect, the invention provides an optical modulator, the modulating comprising:
    a rib waveguide, the rib waveguide including:
        a P+ doped region;
        an N+ doped region; and
        an intrinsic region, disposed between the P+ doped region and N+ doped region;
    wherein the intrinsic region is between 50 nm and 150 nm thick, such that a PIN junction formed by the P+ doped region, N+ doped region, and intrinsic region has a breakdown voltage of less than 12 V and is operable in an avalanche multiplication mode.

In a third aspect, the invention provides an optical modulator, the modulator comprising:
    a rib waveguide, the rib waveguide including:
        a P+ doped region; and
        an N+ doped region;
    wherein the P+ doped region and N+ doped region contain dopants at a concentration of between $1 \times 10^{17}$ and $5 \times 10^{18}$ cm$^{-3}$, such that a PN junction formed by the P+ doped region and the N+ doped region has a breakdown voltage of less than 12 V and is operable in a band-to-band tunnelling mode.

In a fourth aspect, the invention provides an optical modulator, the modulator comprising:
    a rib waveguide, the rib waveguide including:
        a P+ doped region; and
        an N+ doped region;
    wherein the P+ doped region and N+ doped region form a junction having a breakdown voltage of less than 12 V, and the junction is operable in either an avalanche multiplication or band-to-band tunnelling mode.

In a fifth aspect, the invention provides Mach-Zehnder interferometer based modulator comprising two arms, wherein one arm contains an optical modulator as set out as described with reference to any of the second to fourth aspects.

Optional features of the invention will now be set out. These are applicable singly or in any combination with any aspect of the invention.

The breakdown voltage of the junction may be less than 12 V. The breakdown voltage of the junction may be less than or equal to 6 V, and it may be between 2 V and 6V.

The method of operating the modulator of the first aspect may use the modulator as set out in any of the second to fourth aspects.

The rib waveguide may include an upstanding rib, said upstanding rib may have a thickness of between 150 nm and 250 nm.

The rib waveguide may include an upstanding rib, said upstanding rib may have a width of between 400 nm and 500 nm.

The P+ doped region and the N+ doped region may contain dopants with a concentration of between $0.1 \times 10^{18}$ cm$^{-3}$ and $5 \times 10^{18}$ cm$^{-3}$.

The intrinsic region may include dopants with a concentration of between $0.1 \times 10^{16}$ cm$^{-3}$ and $1 \times 10^{16}$ cm$^{-3}$.

The optical modulator may further include a P++ doped region adjacent to the P+ doped region, and an N++ doped region adjacent to the N+ doped region. The P++ doped region and the N++ doped region may include dopants with a concentration of greater than $1 \times 10^{19}$ cm$^{-3}$.

The N+ doped region may be disposed along an uppermost surface of an upstanding rib of the rib waveguide, and wherein the modulator includes an electrically conductive thin film in contact with N+ doped region. In such examples, the modulator may further include a P++ doped region adjacent to the P+ doped region, and the P++ doped region may include dopants with a concentration of greater than $1 \times 10^{19}$ cm$^{-3}$. The electrically conductive thin film may be formed from any one of: a doped single crystalline Silicon film; an Indium Tin Oxide (ITO) film; or a Zinc Oxide (ZnO) film.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
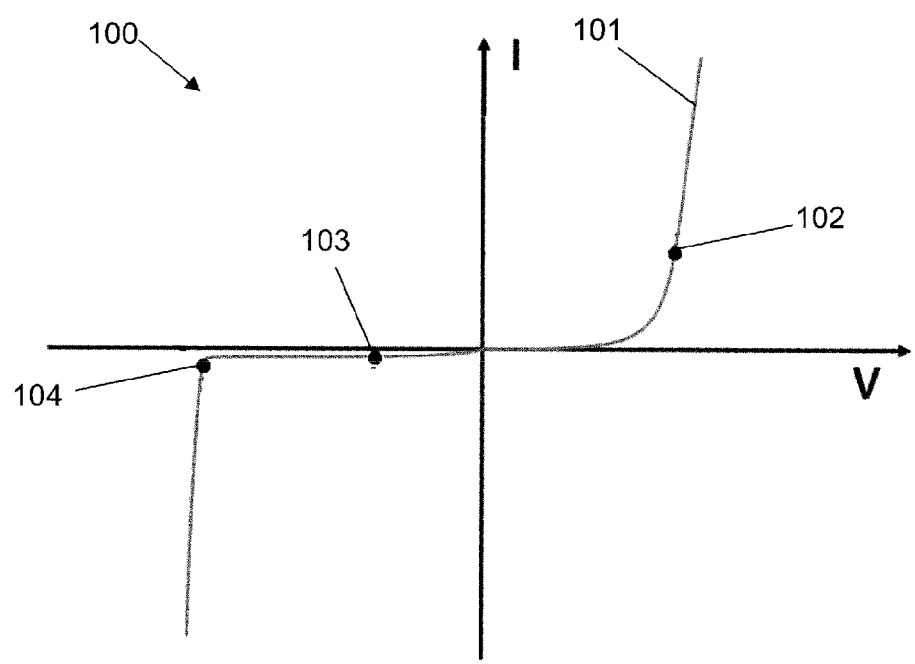
FIG. 1 shows the operational regime of a PIN or PN junction.

FIG. 1 is a plot 100 of voltage against current (also referred to as an I-V characteristic) for a PIN or PN junction. The junction follows the curve 101, which corresponds to a standard I-V characteristic for a diode. The junction operates in a carrier injection mode at point 102 on the curve where it is under forward bias. In the carrier injection mode, minority carriers (for example holes or electrons) are injected into the junction from either side. The minority carriers diffuse into the central region of the junction, and recombine with the majority carriers.

In contrast, the junction operates in a carrier depletion mode at point 103 on the curve (i.e. when it is reverse biased). In this mode, majority charge carries are pushed away from the junction (by the reverse bias) which leaves behind charged ions.

Finally, when sufficient reverse bias is applied, the junction passes a breakdown voltage 104, after which the current increases rapidly (generally exponentially). The mechanism by which the current increases depends on the structure of the junction. In a PN junction, band-to-band tunnelling (i.e. a near or complete alignment between the conduction and valence bands) may occur past the breakdown voltage and a large number of charge carriers may enter the depletion region via tunnelling. In a PIN junction, a large number of charge carriers may be generated via avalanche multiplication (i.e. where the charge carriers are accelerated to a sufficient energy that they can create mobile or free electron-hole pairs via collisions with bound electrons). The avalanche multiplication effect may have a response time in the order of 0.1 ps. A PIN junction may also utilize the band-to-band tunnelling.

Figure 2A:
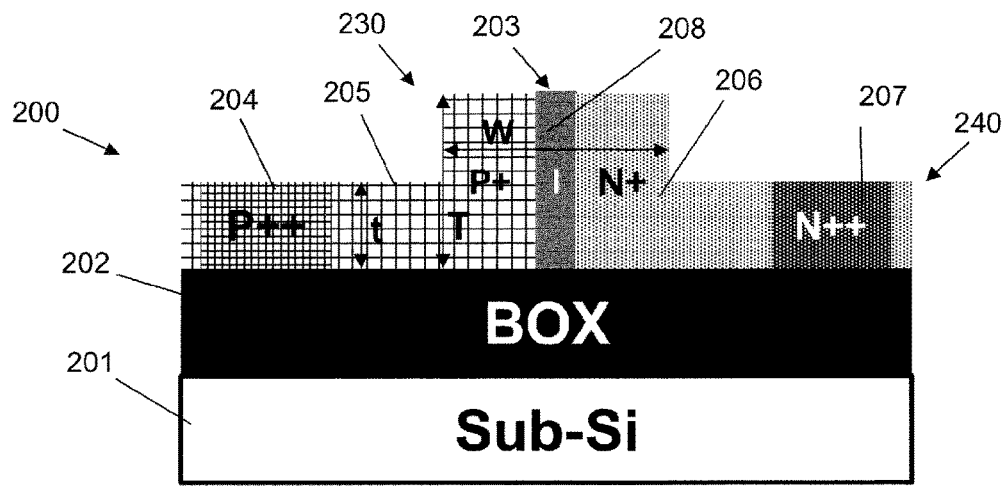
FIGS. 2A-2C show variant geometries of a PIN junction as used in an optical modulator.

FIG. 2A shows, in a cross-sectional view, a PIN junction based optical modulator 200. The optical modulator uses the avalanche effect (and possibly the band-to-band tunnelling effect) in order to operate with an increased modulation speed. The optical modulator broadly comprises: a substrate 201 (which may be a Silicon substrate); a buried oxide layer 202 (BOX) positioned above the substrate layer; and a PIN junction 203 above the buried oxide layer. The PIN junction is formed in a rib waveguide, which comprises a slab 240 and an upstanding rib 230.

The PIN junction 203 is formed of a P++ doped region 204, and adjacent P+ doped region 205. The P+ region is adjacent to an intrinsic region 208 (i.e. one which is not intentionally doped), and on the other side is an N+ doped region 206. The N+ region is connected to an N++ doped region 207. Electrodes (not shown) are connected to the P++ region 204 and the N++ region 207. In this example, the intrinsic region 208 extends from the BOX layer 202 in a straight path away from the BOX layer. The intrinsic region 208 therefore divides the upstanding rib 230 into two equally sized portion. The PIN junction may therefore be described as having a principle axis which is parallel to the BOX layer and passing through the centre of the intrinsic region.

Figure 2B:
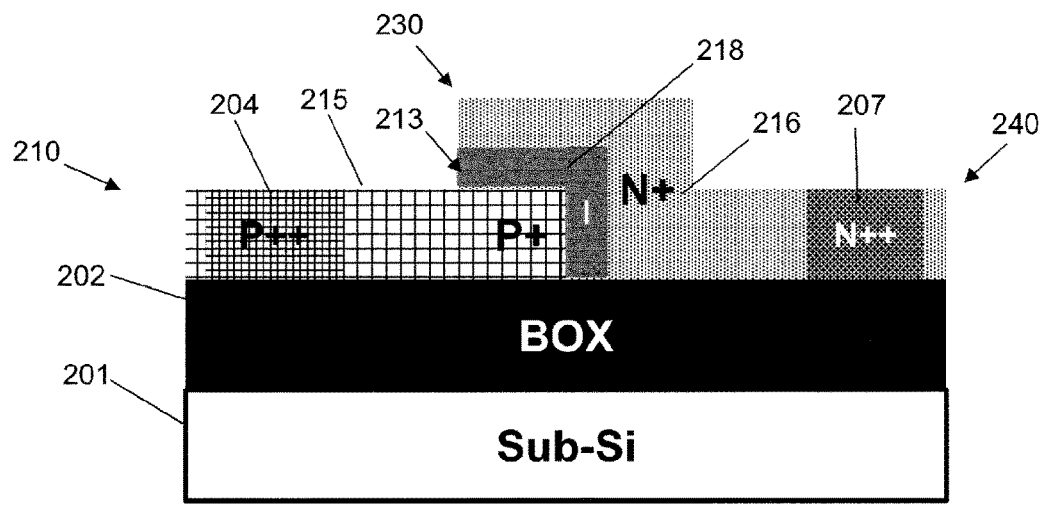

An alternative geometry is shown in FIG. 2B. Like features are indicated by like reference numerals. In the optical modulator 210 shown in FIG. 2B, the intrinsic layer 218 extends linearly a part of the way from the BOX layer before turning by 90° and extending parallel thereto. Therefore the PIN junction of this optical modulator can be described by an axis which is transversal to the box layer e.g. at 45° thereto (as opposed to FIG. 2A where the principal axis is parallel to the BOX layer). As such, the upstanding rib 230 contains a larger proportion of the N+ doped region 216 than the P+ doped region 215. The N+ doped region 216 has a 'Z' shape in comparison to the N+ doped region 206 of the optical modulator 200, and the P+ doped region 216 is not 'L' shaped as opposed to the P+ doped region 205 of the optical modulator 200. The result of this geometry is a larger intrinsic region 218 as compared to the optical modulator 200.

Figure 2C:
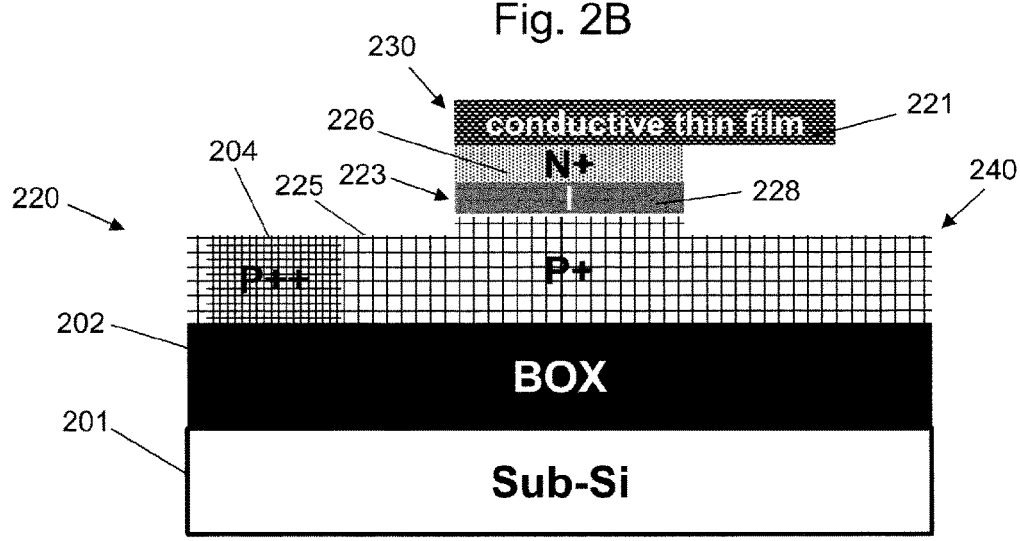

A further variant geometry is shown in FIG. 2C. Like features are indicated by like reference numerals. In contrast to the previous geometries, the PIN junction 223 in FIG. 2C can be described by axis extending perpendicularly to the substrate. The P+ doped layer 225 in optical modulator 220 extends along the width of the slab 240, with the P++ doped layer 204 at one end thereof. Next, within the upstanding rib 230 of the waveguide, an intrinsic layer 228 is disposed on top of the P+ doped layer 225. Finally, an N+ doped layer 226 is disposed over the top of the intrinsic layer 228, therefore forming the PIN junction 223. In this example, instead of an N++ doped region, a conductive thin film 221 is attached to the N+ region along its uppermost surface. The conductive film may be transparent, and may be formed of doped single crystalline Si, or transparent conductive low index materials such as ITO or ZnO.

Figure 3A:
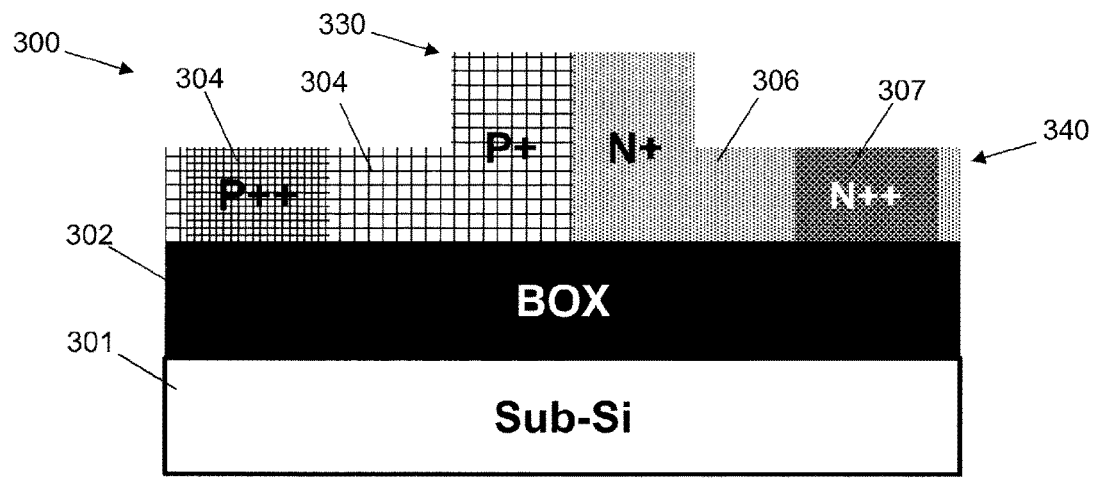
FIGS. 3A-3C show variant geometries of a PN junction as used in an optical modulator.

FIG. 3A shows a PN junction optical modulator 300 which utilises the tunnelling effect (e.g. it may operate as a Zener diode). As the optical modulator approaches breakdown point, will result in a larger number of free carriers being injected into the depletion region via quantum tunnelling between the conduction and valence bands which may result in a higher modulation efficiency. The optical modulator 300 shown in FIG. 3A comprises a substrate 301 (which may be formed of Silicon), on top of which is a buried oxide layer 302 (BOX), with a PN junction position above the buried oxide layer.

The PN junction broadly comprises a P++ doped region 304, which is adjacent to a P+ doped region 305. The P+ doped region is directly adjacent to N+ doped region 306, and the N+ doped region is adjacent to an N++ doped region 407. The P++ doped region and N++ doped region are connected to respective electrodes (not shown).

Figure 3B:
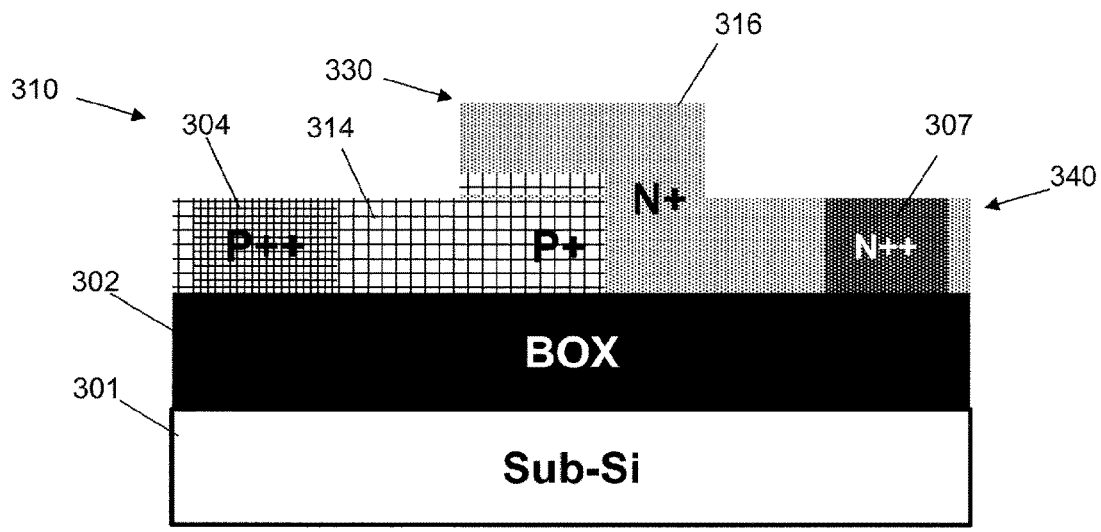

As with the variant optical modulators shown in FIGS. 2B and 2C, the optical modulator shown in FIG. 3A may also have variant geometries. For example, as shown in FIG. 3B the N+ doped region 316 of optical modulator 310 may take a 'Z' shaped form, and therefore extend across the top of the P+ doped region 314. The upstanding rib 330 of the waveguide therefore contains a greater proportion of N+ region than P+ region (whereas, in optical modulator 300, the proportions are equal). Said another way, the principal axis of the PN junction may extends transversely to the substrate.

Figure 3C:
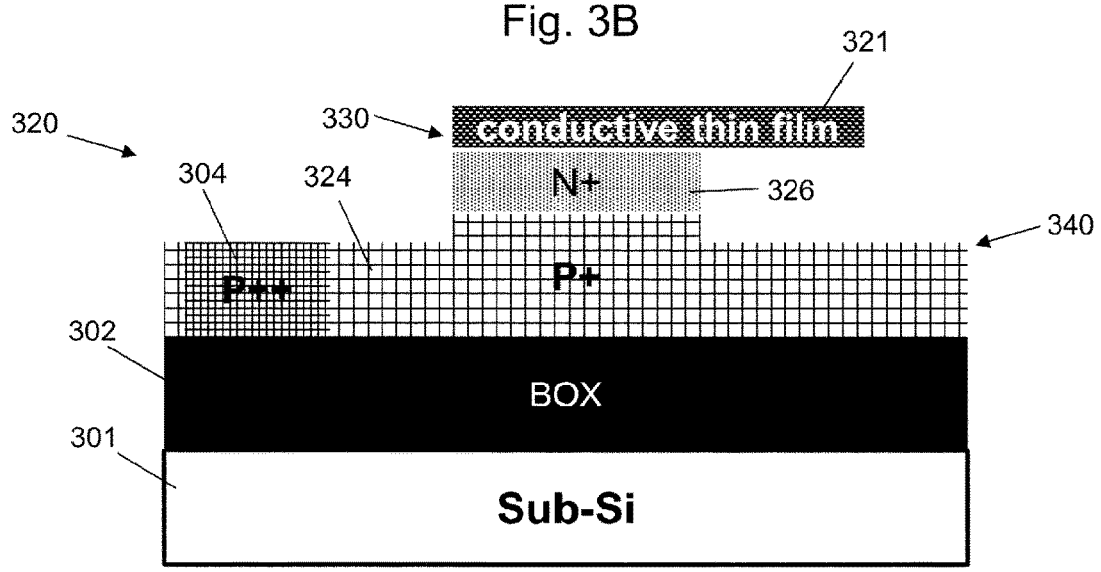

Similarly, FIG. 3C shows an optical modulator 320 which is an example where the principal axis of the PN junction can be described as being perpendicular to the substrate. In this example, the P+ doped region 324 extends across the width of the slab with the P++ region 304 disposed at one end thereof. There is no N++ doped region, instead a conductive thin film 321 is disposed along the outermost surface of the N+ doped region i.e. the top of the upstanding rib 330. The conductive thin film may be formed of a doped single crystalline Silicon film or other transparent conductive low index materials, for example ITO or ZnO.

In general, the P++ doped regions will have a dopant concentration of $>1\times10^{19}$ cm$^{-3}$ as will the N++ doped regions. The P+ and N+ doped regions will generally have a dopant concentration of between $0.1\times5\times10^{18}$ cm$^{-3}$. The intrinsic region should have a dopant concentration of no more than $0.1\times1\times10^{16}$ cm$^{-3}$, and should have a width of between 50-150 nm.

In all examples discussed above, the upstanding rib 230 of the waveguide may have a width —W—(as measured parallel to the BOX layer) of between 400 and 500 nm. The slab may have a thickness—t—of around 100 nm, and the upstanding rib may have a thickness—T—of 220 nm.

Figure 4:
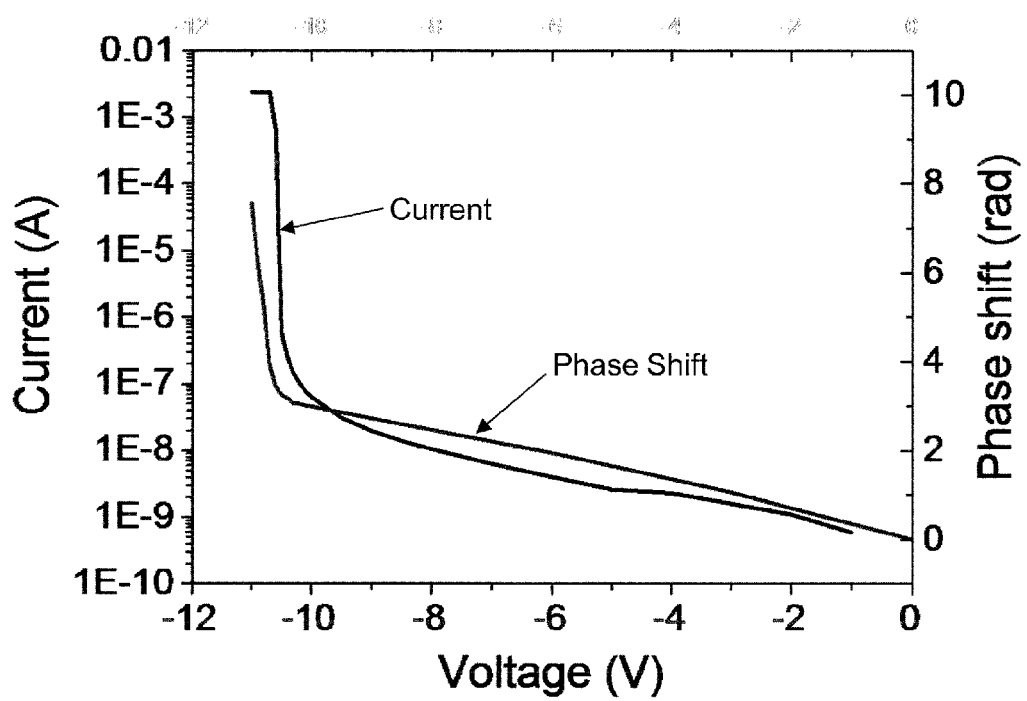
FIG. 4 shows a plot of current, voltage, and phase shift for a PN junction as used in an optical modulator.

Shown in FIG. 4 is a plot of current, voltage and phase shift for a PN junction used as a phase shifter in a Mach-Zehnder modulator (operated in a reverse bias mode). The breakdown voltage is approximately 10.4V, as shown by the drastic reduction in current for voltages less than that. It should be noted that whilst the voltage indicated is negative, it is the absolute magnitude of the voltage which is relevant. Therefore, in this example, voltages of between −10 V and 0 V are considered to be 'less than' −10.4 V by virtue of their absolute magnitude. Of particular note is the behaviour of the phase shift line for voltages less than the breakdown voltage. It will be noted that the phase shift increases at a much faster rate after breakdown, due to the increase in current. This can result in a much greater modulation efficiency.

The device could also be configured in an interleaved or interdigitated junction design i.e. with alternating p-n junction segments.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

LIST OF FEATURES

100 I-V characteristic
101 Device curve
102 Carrier injection region
103 Carrier depletion region
104 Breakdown voltage
200, 210, 220 Optical modulator
300, 310, 320 Optical modulator
201, 301 Substrate
202, 202 BOX layer
203, 213, 223 PIN Junction
204, 304 P++ doped region
205, 215, 225 P+ doped region
304, 314, 324 P+ doped region
206, 216, 226 N+ doped region
306, 316, 326 N+ doped region
207, 307 N++ doped region
208, 218, 228 Intrinsic region
221, 321 Conductive thin film
230, 330 Upstanding rib
240, 340 Slab

The invention claimed is:

1. A method of operating an optical modulator, the optical modulator having:
   a rib waveguide which includes a junction which is either a PIN or PN junction, the junction having a breakdown voltage;
   the method comprising:
   applying a reverse bias to the junction, so as to operate the optical modulator around the breakdown voltage of the junction; and
   operating the optical modulator in an avalanche multiplication and/or band-to-band tunnelling mode by increasing the reverse bias past the breakdown voltage,
   wherein the breakdown voltage of the junction is less than or equal to 6 V.

2. The method of claim 1, wherein the breakdown voltage of the junction is between 2 V and 6 V.

3. The method of claim 1, wherein the rib waveguide includes:
   a P+ doped region;
   an N+ doped region; and
   an intrinsic region, disposed between the P+ doped region and N+ doped region, and
   wherein the intrinsic region is between 50 nm and 150 nm thick, such that a PIN junction formed by the P+ doped region, N+ doped region, and the intrinsic region has a breakdown voltage of less than 6 V and is operable in an avalanche multiplication mode.

4. An optical modulator, the optical modulator comprising:
   a rib waveguide, the rib waveguide including:
   a P+ doped region;
   an N+ doped region; and
   an intrinsic region, disposed between the P+ doped region and N+ doped region,
   wherein the intrinsic region is between 50 nm and 150 nm thick, such that a PIN junction formed by the P+ doped region, N+ doped region, and the intrinsic region has a breakdown voltage of less than 12 V and is operable in an avalanche multiplication mode.

5. The optical modulator of claim 4, wherein the breakdown voltage is less than or equal to 6 V.

6. The optical modulator of claim 4 wherein the rib waveguide includes an upstanding rib, said upstanding rib having a thickness of between 150 nm and 250 nm.

7. The optical modulator of claim 4, wherein the rib waveguide includes an upstanding rib, said upstanding rib having a width of between 400 nm and 500 nm.

8. The optical modulator of claim 4, wherein each of the P+ doped region and the N+ doped region contains dopants with a concentration of between $0.5 \times 10^{18}$ cm$^{-3}$ and $5 \times 10^{18}$ cm$^{-3}$.

9. The optical modulator of claim 4, wherein the intrinsic region includes dopants with a concentration of between $0.1 \times 10^{16}$ cm$^{-3}$ and $1 \times 10^{16}$ cm$^{-3}$.

10. The optical modulator of claim 4, further including a P++ doped region adjacent to the P+ doped region and an N++ doped region adjacent to the N+ doped region.

11. The optical modulator of claim 10, wherein the P++ doped region and N++ doped region include dopants with a concentration of greater than $1 \times 10^{19}$ cm$^{-3}$.

12. The optical modulator of claim 11, wherein the N+ doped region is disposed along an uppermost surface of an upstanding rib of the rib waveguide, and wherein the optical modulator further includes an electrically conductive thin film in contact with the N+ doped region.

13. The optical modulator of claim 12, wherein the optical modulator further includes a P++ doped region adjacent to the P+ doped region, the P++ doped region including dopants with a concentration of greater than $1 \times 10^{19}$ cm$^{-3}$.

14. The optical modulator of claim 12, wherein the electrically conductive thin film is formed from any one of:
   a doped single crystalline Silicon film;
   an Indium Tin Oxide (ITO) film; or
   a Zinc Oxide (ZnO) film.

15. The optical modulator of claim 4, wherein the breakdown voltage is between 2 and 6 V.

16. A Mach-Zehnder interferometer based modulator comprising two arms, wherein one arm contains the optical modulator of claim 4.

17. An optical modulator, the optical modulator comprising:
   a rib waveguide, the rib waveguide including:
      a P+ doped region; and
      an N+ doped region,
   wherein the P+ doped region and N+ doped region contain dopants at a concentration of between $1 \times 10^{17}$ and $5 \times 10^{18}$ cm$^{-3}$, such that a PN junction formed by the P+ doped region and the N+ doped region has a breakdown voltage of less than 12 V and is operable in a band-to-band tunnelling mode,
   wherein the rib waveguide further includes an intrinsic region, disposed between the P+ doped region and N+ doped region, and
   wherein the intrinsic region includes dopants with a concentration of between $0.1 \times 10^{16}$ and $1 \times 10^{16}$ cm$^{-3}$.

18. The optical modulator of claim 17, wherein the breakdown voltage is less than or equal to 6 V.

19. The optical modulator of claim 17, wherein the rib waveguide includes an upstanding rib, said upstanding rib having a thickness of between 150 nm and 250 nm.

20. The optical modulator of claim 17, wherein the rib waveguide includes an upstanding rib, said upstanding rib having a width of between 400 nm and 500 nm.

21. The optical modulator of claim 17, wherein each of the P+ doped region and the N+ doped region contains dopants with a concentration of between $0.5 \times 10^{18}$ cm$^{-3}$ and $5 \times 10^{18}$ cm$^{-3}$.

22. The optical modulator of claim 17, further including a P++ doped region adjacent to the P+ doped region and an N++ doped region adjacent to the N+ doped region.

23. The optical modulator of claim 22, wherein the P++ doped region and N++ doped region include dopants with a concentration of greater than $1 \times 10^{19}$ cm$^{-3}$.

24. The optical modulator of claim 17, wherein the N+ doped region is disposed along an uppermost surface of an upstanding rib of the rib waveguide, and wherein the optical modulator further includes an electrically conductive thin film in contact with the N+ doped region.

25. The optical modulator of claim 24, wherein the optical modulator further includes a P++ doped region adjacent to the P+ doped region, the P++ doped region including dopants with a concentration of greater than $1 \times 10^{19}$ cm$^{-3}$.

26. The optical modulator of claim 17, wherein the breakdown voltage is between 2 and 6 V.

27. A Mach-Zehnder interferometer based modulator comprising two arms, wherein one arm contains the optical modulator of claim 17.

* * * * *